United States Patent
Lai et al.

(10) Patent No.: US 6,218,503 B1
(45) Date of Patent: Apr. 17, 2001

(54) SILICONE-CONTAINING PREPOLYMERS

(75) Inventors: Yu-Chin Lai, Pittsford; Edmond T. Quinn, Rochester, both of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 09/512,905

(22) Filed: Feb. 25, 2000

Related U.S. Application Data

(63) Continuation-in-part of application No. 09/470,064, filed on Dec. 22, 1999, which is a continuation-in-part of application No. 09/079,779, filed on May 15, 1998, now Pat. No. 6,008,317.

(51) Int. Cl.[7] .................................................. C08G 73/10
(52) U.S. Cl. .......................... 528/320; 528/310; 528/312; 528/424; 525/88; 525/157; 525/265; 525/218; 525/25 A; 525/326.9; 525/327.1; 525/329.4; 525/393
(58) Field of Search .................................... 528/320, 310, 528/312, 424; 525/88, 157, 265, 218, 254, 326.9, 327.1, 329.4, 393

(56) References Cited

U.S. PATENT DOCUMENTS

| | | | |
|---|---|---|---|
| 5,034,461 | 7/1991 | Lai et al. | 525/100 |
| 5,128,434 | 7/1992 | Lai | 528/65 |
| 5,451,651 | 9/1995 | Lai | 526/302 |
| 5,523,373 | 6/1996 | Esselborn et al. | 528/26 |
| 5,532,398 | 7/1996 | Wolter et al. | 528/26 |
| 5,969,076 | 10/1999 | Lai et al. | 528/28 |
| 6,008,317 | 12/1999 | Lai et al. | 528/374 |

FOREIGN PATENT DOCUMENTS

| | | | |
|---|---|---|---|
| 0205846 | 12/1986 | (EP) | . |
| 0362145 | 4/1990 | (EP) | C08G/18/61 |
| 0367720 | 5/1990 | (EP) | C08G/18/61 |
| 96/15157 | 5/1986 | (WO) | . |
| 94/29756 | 12/1994 | (WO) | . |
| 95/12568 | 5/1995 | (WO) | . |

*Primary Examiner*—Duc Truong
(74) *Attorney, Agent, or Firm*—John E. Thomas

(57) ABSTRACT

Prepolymers of Formula (I) are useful in hydrogel materials

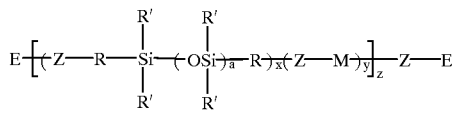

wherein

M is a hydrophilic radical derived from at least one hydrophilic ethylenically unsaturated monomer and having a molecular weight of about 500 to 5000;

each R is independently selected from an alkylene group having 1 to 10 carbon atoms wherein the carbon atoms may include ether, urethane or ureido linkages therebetween;

each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween;

a is an integer equal to or greater than 1;

each U is independently a divalent urethane or ureido segment;

x is greater than or equal to 1, y is greater than or equal to 1; and z is greater than or equal to 1; and each E is independently a polymerizable, ethylenically unsaturated radical.

23 Claims, No Drawings

SILICONE-CONTAINING PREPOLYMERS

This application is a continuation-in-part of U.S. application Ser. No. 09/470,064, filed Dec. 22, 1999 now pending, which is a continuation-in-part of U.S. application Ser. No. 09/079,779, filed May 15, 1998, now U.S. Pat. No. 6,008,317.

BACKGROUND OF THE INVENTION

The present invention generally relates to prepolymers based on block copolymers of a silicone-containing material and a hydrophilic material. The prepolymers are useful as a hydrogel lens material, such as a hydrogel contact lens or intraocular lens material.

Hydrogels represent a desirable class of materials for many biomedical applications, including contact lenses and intraocular lenses. Hydrogels are hydrated, cross-linked polymeric systems that contain water in an equilibrium state. Silicone hydrogels are a known class of hydrogels and are characterized by the inclusion of a silicone-containing material. Typically, a silicone-containing monomer is copolymerized by free radical polymerization with a hydrophilic monomer, with either the silicone-containing monomer or the hydrophilic monomer functioning as a crosslinking agent (a crosslinker being defined as a monomer having multiple polymerizable functionalities) or a separate crosslinker may be employed. An advantage of silicone hydrogels over non-silicone hydrogels is that the silicone hydrogels typically have higher oxygen permeability due to the inclusion of the silicone-containing monomer. Because such hydrogels are based on monomers polymerizable by free radical, these materials are thermosetting polymers.

U.S. Pat. No. 5,034,461 (Lai et al.) discloses polyurethane-containing prepolymers. These prepolymers may be copolymerized with a hydrophilic comonomer to form a silicone hydrogel copolymer that is useful as a contact lens material and other biomedical device applications. The prepolymers exemplified in U.S. Pat. No. 5,034,461 do not include any major hydrophilic portion, and therefore, these prepolymers are copolymerized with a hydrophilic monomer to form a hydrogel copolymer.

This invention provides a prepolymer useful as a hydrogel material, represented by the formula (I):

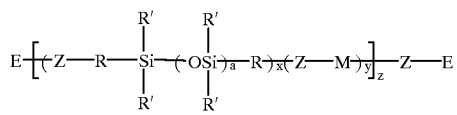

wherein

M is a hydrophilic radical derived from at least one hydrophilic ethylenically unsaturated monomer and having a molecular weight of about 500 to 5000;

each R is independently selected from an alkylene group having 1 to 10 carbon atoms wherein the carbon atoms may include ether, urethane or ureido linkages therebetween;

each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween;

a is an integer equal to or greater than 1;

each Z is independently a divalent urethane or ureido segment;

x is greater than or equal to 1, y is greater than or equal to 1; and z is greater than or equal to 1; and each E is independently a polymerizable, ethylenically unsaturated radical.

The thermosetting polymers and copolymers formed from the prepolymers of this invention are useful in forming thermally stable biomedical devices and lenses.

DETAILED DESCRIPTION OF PREFERRED EMBODIMENTS

The prepolymers of this invention include units of the general formula (I), represented above. The prepolymers include at least one silicone-containing block. More particularly, this silicone-containing block is derived from polysiloxanes endcapped with hydroxyl or amino radicals:

The prepolymers include at least one silicone-containing block. More particularly, this silicone-containing block is derived from polysiloxanes endcapped with hydroxyl or amino radicals:

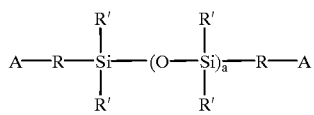

wherein each A is an hydroxyl or amino radical;

each R is independently selected from an alkylene group having 1 to 10 carbon atoms wherein the carbon atoms may include ether, urethane or ureido linkages therebetween;

each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween, and a is an integer equal to or greater than 1.

Preferred R' radicals include: alkyl groups, phenyl groups, fluoro-substituted alkyl groups and alkenyl groups. Preferred R' radicals are alkylene, preferably butylene. Preferably, a is about 10 to about 100, more preferably about 15 to about 60.

The prepolymers also include at least one highly hydrophilic block, represented by the "M" moiety in Formula (I). More particularly, this hydrophilic block can be prepared from at least one ethylenically unsaturated hydrophilic monomer, preferably an amino-substituted (meth) acrylamide or an N-vinyl lactam. Most preferred hydrophilic monomers are N,N-dimethylacrylamide (DMA), N-vinyl pyrrolidone (NVP) and n-octylacrylamide (NOA). The "M" moiety in Formula (I) is conveniently derived from prepolymers of the aforementioned hydrophilic monomers, such prepolymers being endcapped with hydroxyl or amino radicals as in Formula (II):

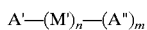

wherein:

A' is derived from a chain transfer agent and includes a terminal hydroxyl or amino radical;

A" is derived from an ethylenically unsaturated monomer that includes a terminal hydroxyl or amino radical;

each M' is derived from at least one hydrophilic ethylenically unsaturated monomer, such as the preferred DMA, NOA and/or NVP;

m is an integer of 1 or greater, and preferably 1; and n is about 5 to 50.

A' in Formula (II) is derived from a chain transfer agent. More specifically, the hydrophilic ethylenically unsaturated monomer M' is polymerized in the presence of the chain transfer agent which serves to control the molecular weight of the resultant polymer and provides hydroxy- or amino- functionality to the resultant polymer. Suitable chain transfer agents include mercapto alcohols (also referred to as hydroxymercaptans) and aminomercaptans. Preferred chain transfer agents include 2-mercaptoethanol and 2-aminoethanethiol. Accordingly, the chain transfer agent forms a terminal end of the hydrophilic polymer, with the hydroxy radical (in the case of a mercapto alcohol) providing the resultant polymer with terminal hydroxyl functionality, and the amino radical (in the case of a aminomercaptan) providing the resultant polymer with terminal amino functionality. Generally, the molar ratio of chain transfer agent to this hydrophilic monomer precursor will be about 1:5 to about 1:100.

The ethylenically unsaturated hydrophilic monomer and the chain transfer agent are copolymerized with another monomer having ethylenic unsaturation and a hydroxy-or amino- radical (A" in Formula (II)). Accordingly, this additional monomer is also copolymerized with the hydrophilic monomer and also provides terminal hydroxy- or amino- functionality to the resultant polymer. Suitable monomers include alcohol esters of (meth)acrylic acid such as 2-hydroxyethylmethacrylate (Hema), allyl alcohol, amino esters of (meth)acrylic acid such as 2-t-butyl-aminoethylmethacrylate, and allylamine. Generally, this hydroxy- or amino-containing ethylenically unsaturated monomer will be at a 1:1 molar ratio to the chain transfer agent.

In the case where the "M" moiety of the hydrophilic block is based on more than one type of hydrophilic monomer, the "M" moiety is conveniently derived from prepolymers of the following Formula (IIa):

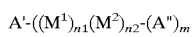

wherein:

A', A" and m are as previously defined;

$M_1$ is derived from a first hydrophilic ethylenically unsaturated monomer;

$M_2$ is derived from a second hydrophilic ethylenically unsaturated monomer;

each of n1 and n2 is at least one, and n1+n2 is about 5 to 50.

Representative reaction schemes for these hydrophilic precursors of Formula (II) are illustrated as follows:

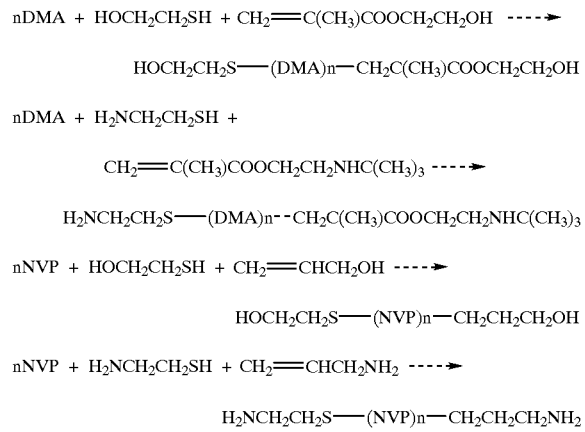

Representative reaction schemes are illustrated as follows in the case the hydrophilic precursors are based on two different hydrophilic monomers as in Formula (IIa):

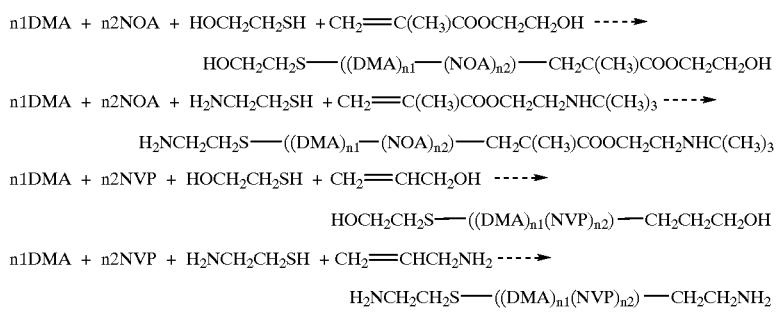

In the above representative schemes, (DMA) is

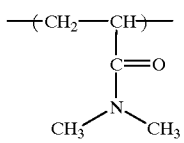

(NVP) is

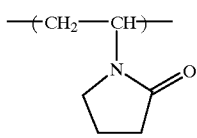

and (NOA) is

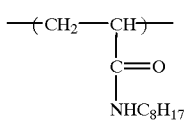

Such synthesis methods for the hydrophilic precursors will typically involve thermal polymerization by methods generally known in the art. Representative detailed syntheses of preferred precursors of Formula (II) are described in the Examples.

The aforementioned silicone-containing block and hydrophilic block are linked via "hard" segments, represented by "Z" in Formula (I). These "hard" segments are based on urethane/urea chemistry. More specifically, these "hard" segments are based on diilsocyanates that react with hydroxyl- or amino-functionality, respectively, of the silicone-containing blocks and hydrophilic blocks.

Generally, any diisocyanate may be employed. These diisocyanates may be aliphatic or aromatic, and include alkyl, alkyl cycloalkyl, cycloalkyl, alkyl aromatic and aromatic diisocyanates preferably having 6 to 30 carbon atoms in the aliphatic or aromatic moiety. Specific examples include isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate.

The "hard" segments forming the "Z" moiety in Formula (I) may be further based on a relatively low molecular weight diol or glycol. That is, the "Z" moiety may be based on the divalent reaction product of the diisocyanate and a short-chain diol, preferably at a 2:1 molar ratio. In such a case, the Z moiety in Formula (I) may be represented as

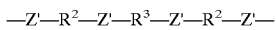

where each Z' is independently a urethane or ureido linkage; each $R^2$ is independently a divalent residue of the diisocyanate; and each $R^3$ is independently a divalent residue of the diol or glycol. Representative diols include an alkyl diol, a cycloalkyl diol, an alkyl cycloalkyl diol, an aryl diol or an alkylaryl diol having 1 to 40 carbon atoms and which may contain ether, thio or amine linkages in the main chain. Specific examples include 2,2-(4,4'-dihydroxydiphenyl) propane (bisphenol-A), 4,4'-iso-propylidine dicyclohexanol, ethoxylated and propoxylated bisphenol-A, 2,2-(4,4'-dihydroxydiphenyl)pentane, 1,1'-(4,4'-dihydroxydiphenyl)-p-diisopropyl benzene, 1,3-cyclohexane diol, 1,4-cyclohexane diol, 1-4-cyclohexane dimethanol, neopentyl glycol, 1,4-butanediol, 1,3-propanediol, 1,5-pentanediol, diethylene glycol and triethylene glycol. Especially preferred are alkyl and oxyalkylene diols having 1 to 10 carbon atoms.

The prepolymers are terminated with polymerizable, ethylenically unsaturated radicals, represented by "E" in Formula (I). These ethylenically unsaturated radicals are linked to the aforementioned silicone-containing block and hydrophilic block via the divalent urethane or ureido segment "U" segments. Representative E radicals are represented by the fonnula:

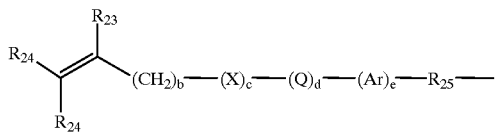

wherein:
$R_{23}$ is hydrogen or methyl;
each $R_{24}$ is hydrogen, an alkyl radical having 1 to 6 carbon atoms, or a —CO—Y—$R_{26}$ radical wherein Y is —O—, —S— or —NH—;
$R_{25}$ is a divalent alkylene radical having 1 to 10 carbon atoms;
$R_{26}$ is a alkyl radical having 1 to 12 carbon atoms;
Q denotes —CO— or —OCO—;
X denotes —O— or —NH—;
Ar denotes an aromatic radical having 6 to 30 carbon atoms; b is 0 to 6; c is 0 or 1; d is 0 or 1; and e is 0 or 1.

Suitable endcapping precursors, for forming the E radicals, include: hydroxy-terminated (meth)acrylates, such as 2-hydroxyethylmethacrylate, 2-hydroxyethylacrylate, and 3-hydroxypropylmethacrylate; and amino-terminated (meth)acrylates), such as t-butylaminoethylmethacrylate and aminoethylmethacrylate; and (meth)acrylic acid.

Methods for forming urethane or urea polymers are known in the art, and representative synthesis is illustrated in the Examples.

The subject prepolymers can be cast into shaped articles, such as contact lenses or intraocular lenses, by conventional methods commonly used in polymerizing ethylenically unsaturated monomeric materials. As one example, a liquid or semi-liquid mixture containing the prepolymer may be charged to a mold of the desired shape, followed by polymerizing (or curing) the mixture in the mold. Various processes are known for curing a monomeric mixture in the production of contact lenses, including spincastinig and static casting. Spincasting methods involve charging the monomer mixture to a mold, and spinning the mold in a controlled manner while exposing the monomer mixture to a light source such as UV light. Static casting methods involve charging the monomer mixture between two mold sections, one mold section shaped to form the anterior lens surface and the other mold section shaped to form the posterior lens surface, and curing the monomer mixture. Other known methods involve forming articles in the form of buttons (or blanks) and then lathe cutting the buttons into lenses.

Polymerization may be facilitated by exposing the mixture to heat and/or radiation, such as ultraviolet light, visible light, or high energy radiation. A polymerization initiator may be included in the mixture to facilitate the polymerization step. Representative free radical thermal polymerization initiators are organic peroxides, such as acetal peroxide, lauroyl peroxide, decanoyl peroxide, stearoyl peroxide, benzoyl peroxide, tertiarylbutyl peroxypivalate, peroxydicarbonate, and the like. Representative UV initiators are those known in the field such as, benzoin methyl ether, benzoin ethyl ether, Darocure 1173, 1164, 2273, 1116, 2959, 3331 (EM Industries) and Igracure 651 and 184 (Ciba-Geigy), and the like. Generally, the initiator will be employed in the monomeric mixture at a concentration of about 0.01 to 1 percent by weight of the total mixture.

Homopolymerization of the prepolymers will yield a copolymer, that when hydrated, forms a hydrogel. Optionally, a hydrophilic comonomer may be included in the initial monomeric mixture containing the subject prepolymer, for example, if it is desired to obtain a more hydrophilic copolymer. Representative hydrophilic comonomers include: unsaturated carboxylic acids, such as methacrylic and acrylic acids; (meth)acrylic substituted alcohols, such as 2-hydroxyethylmethacrylate and 2-hydroxyethylacrylate; vinyl lactams, such as N-vinyl pyrrolidone; and (meth)acrylamides, such as methacrylamide and N,N-dimethylacrylamide. Optionally, a silicone-containing comonomer may be included in the initial monomeric mixture containing the subject prepolymer, for example, if it is desired to obtain a copolymer with higher oxygen permeability. Representative silicone-containing comonomers include methacryloxypropyl tris(trimethylsiloxy)silane (TRIS), pentamethyldisiloxanyl methylmethacrylate, tris(trimethylsiloxy) methacryloxy propylsilane, phenyltetramethyl-disiloxanylethyl acrylate, methyldi(trimethylsiloxy)methacryloxymethyl silane, 3-[tris(trimethylsiloxy)silyl] propyl vinyl carbamate, 3-[tris(trimethylsiloxy)silyl] propyl allyl carbamate, and 3-[tris(trimethylsiloxy)silyl] propyl vinyl carbonate.

As an illustration of the present invention, several examples are provided below. These examples serve only to further illustrate various preferred embodiments of the invention and should not be construed as limiting the invention.

EXAMPLE 1

Preparation of Hydroxy-terminated Poly(NVP) with Targeted Mn of 1000

To a dried 500-mL round bottom flask equipped with a reflux condenser was added NVP (86.43 g/0.78 mole), allyl alcohol (5.79 g/0.0997 mole) and anhydrous THF (200 mL). The contents were flushed with nitrogen for 15 minutes. Then 2-mercaptoethanol (7.79 g /0.099 mole ) and AIBN (at 0.5 mole % of NVP) were added. The mixture was heated at 60° C. for 20 hours and poured into a beaker containing ether to precipitate the product. The product was vacuum dried to yield 92 grams. Size exclusion chromatography of the product indicated a number average molecular weight (Mn) of 1066, a molecular weight (MW) of 1312, and a polydispersity (Pd) of 1.23 (based on polystyrene standards). The hydroxy-equivalent weight as determined by titration (adding excess isophorone diisocyanate to react with the OH groups in the polymer, and then excess di-n-butylamine to react with the isocyanate groups, followed by titration with hydrochloric acid) was 594, translating to MW of 1188.

A second batch of hydroxy-terminated poly(NVP) was prepared in the same manner. The final determined hydroxy equivalent weight was 565, translating to molecular weight of 1130.

EXAMPLE 2

Preparation of Hydroxybutyl-terminated Polydimethylsiloxane (PDMS) of Varying Molecular Weights The subject hydroxybutyl-terminated PDMS prepolymers were prepared by reacting 1,4-bis-hydroxybutyl-tetramethyldisiloxane and dimethoxydimethyl silane at different molar ratios, based on targeted molecular weight, according to procedures known in the art and described in Journal of Polymer Science—Chemistry, 33, 1773 (1995). The molecular weights of the final purified products, as determined by titration as described in this publication, were 2450, 3698 and 4059. These samples of hydroxybutyl-terminated PDMS are employed in the following examples:

EXAMPLE 3

Preparation of Prepolymer with One Block of Hydroxybutyl-terminated PDMS (Mn about 4000) and Two Blocks of Poly(NVP)

A 1-L, 3-neck round bottom flask was charged with 17.8571 grams (0.0803 mole) of isophorone diisocyanate, 4.2637 grams (0.04017 mole) of diethylene glycol, 0.2676 grams of dibutyltin dilaurate and 60 mL of anhydrous methylene chloride. The mixture was refluxed under nitrogen. After leaving the reaction mixture overnight, the percentage of isocyanate dropped to 46.5% of original. Then 23.886 grams (0.020 mole) of hydroxy-terminated poly (NVP) of Example 1 and 40.5860 grams (0.010 mole) of the hydroxybutyl-terminated PDMS were added to the reaction flask along with 200 mL of methylene chloride. After 48 hours, the isocyanate content dropped to 13.86% of original. The reaction mixture was cooled to ambient temperature, and then 2.8645 grams (0.022 moles) of 2-hydroxyethyl methacrylate (HEMA) was added. Samples of the reaction mixture were taken periodically for measurement of IR spectrum, and the reaction was terminated when the isocyanate peak disappeared from IR spectrum of the reaction mixture. The solvent was then stripped and the final product was recovered.

EXAMPLE 4

Preparation of Hydrogel Films From a Polyurethane Prepolymer of Example 3

The prepolymer described in Example 3 was dissolved in equal amounts of hexanol and 0.2% of Darocur-1173 initiator, then the mixture was cast between silane-treated glass plates and cured under UV light for 1 hour. After extraction in isopropanol for four hours, the films were boiled in water for 4 hours and placed in borate buffered saline. The resultant hydrogel films had the following properties: water content 39.4 weight percent, modulus 379 g/mm$^2$, tear strength 5 g/mm, and oxygen permeability of 81 in Dk units.

EXAMPLE 5

Preparation of Hydrogel Films From the Prepolymer of Example 3 and Other Comonomers A prepolymer described in Example 3 (32 parts by weight, pbw) was mixed with the following comonomers: DMA (32 pbw) and TRIS (36 pbw). Additionally, this monomer mixture included hexanol (27 pbw) and Darocur- 1173 initiator (0.3 pbw). The mixture was cast and processed into hydrogel films by applying a procedure similar to that described in Example 4. The resultant hydrogel films had the following properties: water content 39 weight percent, modulus 36 g/mm$^2$, tear strength 13 g/mm, and oxygen permeability 93 Dk.

EXAMPLE 6

Preparation of a Prepolymer with Two Blocks of Hydroxybutyl-terminated PDMS (Mn 2450) and Two Blocks of Poly(NVP)

The subject prepolymer was prepared following the procedure of Example 3 except that hydroxybutyl-terminated PDMS of Mn 2450 was used, and the molar ratio of isophorone diiusocyanate/diethylene glycol:PDMS:poly (NVP) reactants was 5:2:2.

EXAMPLE 7

Preparation of Hydrogel Films From the Prepolymer of Example 6

Hydrogel films were prepared from the prepolymer of Example 6, following the procedure as described in Example 4. The hydrogel films had the following properties: water content 34.5 weight percent, oxygen permeability 105 Dk, modulus 472 g/mm$^2$ and tear strength 6 g/mm.

EXAMPLE 8

Preparation of Hydroxy-terminated Poly(DMA) with Targeted Molecular Weight of 1500 (or hydroxy-equivalent of 750)

To a thoroughly dried 500-mL round bottom flask equipped with a reflux condenser, was added DMA (99.18 g/1.00 mole), HEMA (7.17 g/0.055 mole) and anhydrous THF (220 mL). The contents were flushed with nitrogen for 15 minutes. Then 2-mercaptoethanol (4.30 g/0.055 mole) and AIBN (1.64 g/0.5 mole % of DMA) were added. The mixture was heated at 60° C. for 24 hours, and then poured into a beaker containing ether to precipitate the product. The hydroxy-equivalent as determined by titration (by adding excess isophorone diisocyanate to react with the OH groups in the polymer, and then excess di-n-butylamine to react with isocyanate groups, followed by titration with hydrochloric acid) was 818. Size exclusion chromatography (SEC) results (based on polystyrene standard) indicated Mn 1549, Mw 4394, and Pd 2.84.

EXAMPLES 9

Preparation of Prepolymer with Simultaneous Addition of Hydroxybutyl-terminated PDMS of Mn 3700 and Poly(DMA) of Mn 1635 and Isophorone Diisocyanate A 1-L, 3-neck round bottom flask was charged with 7.32 grams (0.00446 mole) of the hydroxy-terminated poly (DMA ) of Example 8. The contents were vacuum dried at 80° C. overnight. Then 3.3433 grams (0.01487 mole) of isophorone diisocyanate, 24.7078 grams (0.006697 mole) of hydroxybutyl-terminated PDMS of Example 2 (Mn about 3700), dibutyltin dilaurate (0.1032 g) and anhydrous methylene chloride (140 mL) were added. The mixture was refluxed under nitrogen. After 72 hours the percentage of isocyanate dropped to 23.2% of original, and then 20.9959 grams of HEMA and 0.0037 g of bis-1,1'-binaphthol were added. The reaction was suspended when the isocyanate peak disappeared from IR spectrum of the reaction mixture. The solvent was then stripped and the final product was recovered.

EXAMPLE 10

Preparation of Hydrogel Film From the Prepolymer of Example 9

The prepolymer described in Example 9 was dissolved in n-hexanol at a 57:43 weight ratio and 0.3% of Darocur-1173 initiator was added, then the mixture was cast between silane-treated glass plates and cured under UV light for 1 hour. After extraction in isopropanol for four hours, the films were boiled in water for 4 hours and then placed in borate buffered saline. The hydrogel films were optically clear. The hydrogel films had the following properties: water content 13.2 weight percent, modulus 178 g/mm$^2$, tear strength 4 g/mm, and oxygen permeability 366 Dk.

EXAMPLE 11

Preparation of Hydrogel Films From the Prepolymer of Example 9 and DMA Comonomer The prepolymer described in Example 9 (90 pbw) was mixed with DMA (10 pbw), hexanol (35 pbw), and Darocur-1173 initiator (0.3 pbw). The mixture was then cast and processed into hydrogel films according to the procedure described in Example 4. The hydrogel films were optically clear and had the following properties: water content 25 weight percent, modulus 173 g/mm$^2$, tear strength 2 g/mm, and oxygen permeability 149 Dk.

EXAMPLE 12

Preparation of Prepolymer with Simultaneous Addition of Hydroxybutyl-terminated PDMS of Mn 3700 and Poly(NVP) of Mn 1130 and Isophorone Diisocyanate A 1-L, 3-neck round bottom flask was charged with 10.87 grams (0.00962 mole) of the hydroxy-terminated poly(NVP) from Example 1. The contents were vacuum dried at 80° C. overnight. Then 5.7632 grams (0.02564 mole) of isophorone diisocyanate, 35.4841 grams (0.009626 mole) of hydroxybutyl-terminated polydimethylsiloxane from Example 2 (Mn about 3700), 0.1637 grams of dibutyltin dilaurate and 150 mL of anhydrous methylene chloride were added. The mixture was refluxed under nitrogen, and after 48 hours, the percentage of isocyanate dropped to 25.5% of original. Then 2.0486 grams of HEMA and 0.0055 g of bis-1,1'-binaphthol were added. The reaction was suspended when the isocyanate peak disappeared from IR spectrum of the reaction mixture. The solvent was stripped and the final product was recovered.

EXAMPLE 13

Preparation of Hydrogel Films From Polyurethane Prepolymer of Example 12

The prepolymer of Example 12 was dissolved in n-hexanol at a 50:50 weight ratio and 0.3% of Darocur-1173 was added, then the mixture was cast between silane-treated glass plates and cured under UV light for 1 hour. After extraction in isopropanol for four hours, the films were boiled in water for 4 hours and then placed in borate buffered saline. The resultant hydrogel film had the following properties: water content 10 weight percent, modulus 84 g/mm$^2$, tear strength 4 g/mm, and oxygen permeability 260 Dk.

EXAMPLE 14

Preparation of Prepolymer by Mixing Isocyanate-capped Hydrophilic Polymer and Hydroxybutyl-terminated PDMS Before Endcapping with Methacrylate Polymerizable Groups A 1-L, 3-neck round bottom flask was charged with hydroxybutyl-terminated polydimethylsiloxane from Example 2 (24.0905 g, Mn 3698), isophorone diisocyanate (0.7332 g), dibutyltin dilaurate (0.0742 g) and methylene chloride (100 mL). The contents were refluxed for 22 hours until the isocyanate group disappeared from IR spectrum of the reaction mixture.

Separately, a 1-L, 3-neck round bottom flask was charged with poly(DMA) from Example 9 (10.71 g, Mn about 1640), isophorone diiusocyanate (2.9344 g), dibutyltin dilaurate (0.0430 g) and methylene chloride. (60 mL). The contents were refluxed overnight, and the isocyanate content dropped to 48.2% as determined by titration. Then the solution containing the polydimethylsiloxane polymer was added into the solution containing the NCO-endcapped poly (DMA) at the molar ratio of 1:2. After 20 hours, the isocyanate content dropped to 23.4%. The contents were cooled to ambient temperature, and HEMA (0.9549 g) and 1,1'-bi-2-naphthol (0.0041 g) were added. The mixture was stirred until the isocyanate group disappeared from the IR spectrum of the reaction mixture.

EXAMPLE 15

Preparation of Hydroxy-terminated Copolymer of DMA and n-octylacrylamide with Targeted Molecular Weight of 1500 (or hydroxy-equivalent weight of 750)

To a thoroughly dried 500-mL round bottom flask equipped with a reflux condenser were added DMA (17.7 g/0.179 mole), n-octylacrylamide (6.6 g/0.03607 mole, NOA), HEMA (2.3 g/0.0177 mole) and anhydrous THF (200 mL). The contents were flushed with nitrogen for 15 minutes. Then 2-mercaptoethanol (1.4 g/0.0175 mole) and AIBN (0.2 g/0.5 mole % of DMA) were added. The mixture was heated at 60° C. for 20 hours and poured into a beaker containing ether to precipitate the product. The product was vacuum dried, and the final product was recovered. FTIR (cm$^{-1}$): 3318, 2926, 2856, 1722, 1628, 1496, 1457, 1398, 1354, 1259, 1137, 1088, 1056, 730 and 699. SEC indicated Mn 912, MW 2210, and Pd 2.43 (based on polystyrene standards). The hydroxy-equivalent weight as determined by titration (by adding excess of isophorone diisocyanate to react with the OH groups in the polymer, and then excess di-n-butylamine to react with isocyanate groups, followed by titration with hydrochloric acid) was 773, or Mn of 1546.

EXAMPLE 16

Preparation of Prepolymer by Mixing Isocyanate-capped Hydrophilic Copolymer of DMA/NOA and Hydroxybutyl-terminated PDMS Before Endcapping with Methacrylate Polymerizable Groups A 1 -L, 3-neck round bottom flask was charged with hydroxybutyl-terminated polydimethylsiloxane from Example 2 (16.15 g, Mn 3698), isophorone diisocyanate (0.493 g), dibutyltin dilaurate (0.0485 g) and methylene chloride (100 mL). The contents were refluxed for 22 hours until the isocyanate group disappeared from IR spectuim of the reaction mixture.

Separately, a 1-L, 3-neck round bottom flask was charged with the hydroxy- terminated copolymer of DMA and NOA of Example 15 (6.77 g/0.004379 mole), isophorone diisocyanate (1.9678 g/0.008757 mole) dibutyltin dilaurate (0.0264 g) and methylene chloride (18 mL). The contents were refluxed overnight, and the isocyanate content dropped to 40.2% as determined by titration. Then the solution containing the polydimethylsiloxane polymer was added into the solution containing the NCO-endcapped hydrophilic DMA/NOA copolymer at the molar ratio of 1:2. After 20 hours, the isocyanate content dropped to 14.9%. The contents were cooled to ambient temperature, and HEMA (0.4093 g) and 1,1'-bi-2-naphthol (0.0198 g) were added, and the mixture was stirred. After 80 hours, no isocyanate content was indicated

EXAMPLE 17

Preparation of Hydrogel Films From a Polyurethane Prepolymer of Example 16

The prepolymer described in Example 16 was dissolved in n-hexanol at a 70:30 weight ratio and 0.3% of Darocur-1173 initiator was added, then the mixture was cast between silane-treated glass plates and cured under UV light for 1 hour. After extraction in isopropanol for four hours, the films were boiled in water for 4 hours and then placed in borate buffered saline. The hydrogel films were optically clear and had the following properties: water content 16.5 weight percent, modulus 93 g/mm$^2$, tear strength 6 g/mm, and oxygen permeability 198 Dk.

Many other modifications and variations of the present invention will be evident to the skilled practitioner in the field in light of the teachings herein. It is therefore understood that, within the scope of the claims, the present invention can be practiced other than as specifically described.

We claim:

1. A prepolymer represented by the formula:

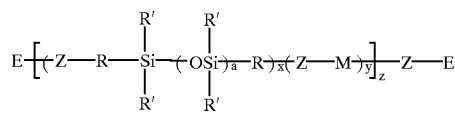

wherein

M is a hydrophilic radical derived from at least one hydrophilic ethylenically unsaturated monomer and having a molecular weight of about 500 to 5000;

each R is independently selected from an alkylene group having 1 to 10 carbon atoms wherein the carbon atoms may include ether, urethane or ureido linkages therebetween;

each R' is independently selected from hydrogen, monovalent hydrocarbon radicals or halogen substituted monovalent hydrocarbon radicals wherein the hydrocarbon radicals have 1 to 18 carbon atoms which may include ether linkages therebetween;

a is an integer equal to or greater than 1;

each Z is independently a divalent urethane or ureido segment;

x is greater than or equal to 1, y is greater than or equal to 1; and z is greater than or equal to 1; and each E is independently a polymerizable, ethylenically unsaturated radical.

2. The prepolymer of claim 1, wherein M is derived from an N-substituted (meth)acrylamide.

3. The prepolymer of claim 2, wherein M is derived from N,N-dimethylacrylamide.

4. The prepolymer of claim 1, wherein M is derived from an N-vinyl lactam.

5. The prepolymer of claim 4, wherein M is derived from N-vinyl pyrrolidone.

6. The prepolymer of claim 1, wherein M is derived from the prepolymer wherein:

A' is derived from a chain transfer agent and includes a terminal hydroxyl or amino radical;

A" is derived from an ethylenically unsaturated monomer that includes a terminal hydroxyl or amino radical;

M' is derived from at least one hydrophilic ethylenically unsaturated monomer; and n is about 5 to 50 and m is an integer of 1 or greater.

7. The prepolymer of claim 6, wherein (M')$_n$ has the formula:

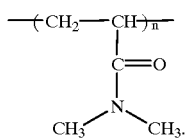

8. The prepolymer of claim 6, wherein (M')$_n$ has the formula:

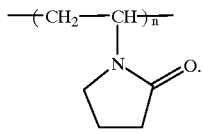

9. The prepolymer of claim 6, wherein (M')$_n$ is derived from a copolymer of dimethylacrylamide and n-octylacrylamide.

10. The prepolymer of claim 1, wherein a Z moiety in the formula is represented by

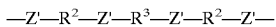

where each Z' is independently a urethane or ureido linkage; each R$^2$ is independently a divalent residue of a diisocyanate, and each R$^3$ is independently a divalent residue of a diol or glycol.

11. The prepolymer of claim 10, wherein R$^3$ is the divalent residue of a diol or glycol having 1 to 40 carbon atoms.

12. The prepolymer of claim 11, wherein R$^3$ is the divalent residue of an alkylene or oxyalkylene diol having 1 to 10 carbon atoms.

13. The prepolymer of claim 11, wherein R$^3$ is the divalent residue of diethylene glycol.

14. The prepolymer of claim 10, wherein each R$^2$ is independently a divalent residue of an alkyl, alkyl cycloalkyl, cycloalkyl, alkyl aromatic or aromatic diisocyanate having 6 to 30 carbon atoms in the aliphatic or aromatic moiety.

15. The prepolymer of claim 14, wherein R$^2$ is a selected from the group consisting of isophorone diisocyanate, hexamethylene-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, and cyclohexane diisocyanate.

16. The prepolymer of claim 15, wherein R$^2$ is a divalent residue of isophorone diisocyanate.

17. A hydrogel that is the hydrated polymerization product of a mixture including the prepolymer of claim 1.

18. The hydrogel of claim 17, wherein the mixture further includes a comonomer.

19. The hydrogel of claim 18, wherein the mixture includes at least one hydrophilic comonomer selected from the group consisting of unsaturated carboxylic acids, (meth) acrylic substituted alcohols, vinyl lactams, and (meth) acrylamides.

20. The hydrogel of claim 18, wherein the mixture includes at least one silicone-containing comonomer.

21. The hydrogel of claim 18, wherein the mixture includes a hydrophilic comonomer and a silicone-containing comonomer.

22. A biomedical device formed of the hydrogel of claim 17.

23. The biomedical device of claim 22, having the form of a contact lens.

* * * * *

UNITED STATES PATENT AND TRADEMARK OFFICE
CERTIFICATE OF CORRECTION

PATENT NO.     : 6,218,503 B1
DATED          : April 17, 2001
INVENTOR(S)    : Yu-Chin Lai and Edmond T. Quinn It is certified that error appears in the above-identified patent and that said Letters Patent is hereby corrected as shown below:

<u>Column 12,</u>
Line 57, after the word "prepolymer", insert -- $A' - (M')_n - (A'')_m$ --

Signed and Sealed this

Twenty-fifth Day of June, 2002

*Attest:*

*Attesting Officer*

JAMES E. ROGAN
*Director of the United States Patent and Trademark Office*